United States Patent
Suzuki et al.

[11] Patent Number: 6,104,886
[45] Date of Patent: Aug. 15, 2000

[54] PRINT SYSTEM AND ELECTRONIC CAMERA

[75] Inventors: Takeshi Suzuki, Akiruno; Akio Terane, Sagamihara, both of Japan

[73] Assignee: Olympus Optical Co., Ltd., Tokyo, Japan

[21] Appl. No.: 09/145,688

[22] Filed: Sep. 2, 1998

[30] Foreign Application Priority Data

Sep. 9, 1997 [JP] Japan .................................. 9-244486

[51] Int. Cl.$^7$ .................................................. G03D 29/00
[52] U.S. Cl. ........................... 396/429; 396/422; 396/544
[58] Field of Search ........................... 396/213; 348/375; 340/636

[56] References Cited

U.S. PATENT DOCUMENTS

| | | | |
|---|---|---|---|
| 4,937,676 | 6/1990 | Finelli et al. | 348/375 |
| 5,182,546 | 1/1993 | Shinbori et al. | 340/636 |
| 5,198,851 | 3/1993 | Ogawa | 396/213 |

*Primary Examiner*—D. Rutledge
*Attorney, Agent, or Firm*—Volpe and Koenig, P.C.

[57] ABSTRACT

A print system comprises an electronic camera with an auto-power-off function, for taking in image formation of a subject image, and a printer for printing the image information taken in the electronic camera. The auto-power-off function is disabled during a process of printing the image information by the printer, and enabled after the process of printing the image information by the printer is finished.

8 Claims, 5 Drawing Sheets

PRINT SYSTEM AND ELECTRONIC CAMERA

BACKGROUND OF THE INVENTION

The present invention relates to a print system which takes in image information via an electronic camera incorporating an imaging element and prints an image based on the image information.

The invention also relates to an electronic camera for used in the print system.

Recently, various methods of using electronic cameras such as digital cameras which take in image information of subjects through imaging elements have been proposed. Image information acquired by the digital camera is transferred to a personal computer and then observed on a monitor or printed by a printer. Alternatively, the image information is directly transferred to the printer and printed out, that is, it is directly printed.

For the direct printing, a special-use digital printer incorporating an image memory is generally used. In a case where image information taken in the digital camera is transferred to the digital printer, the image information is transferred to the printer-side image memory via communication drivers of both camera and printer and printed.

However, when the direct printing is performed, the communication time as viewed from the digital camera side sharply differs from the communication time in a case where data is normally transmitted to the personal computer. Specifically, the state of ordinary data transmission among personal computers varies according to the operation speed, etc. of the reception-side computer. In general, the computer keeps on transmitting data at a fixed rate. Even if a wait command is issued during the transmission, the start and stop of the operation are repeated at a predetermined ratio. By contrast, in the direct printing, it is necessary to transmit data in accordance with the printing speed. Thus, if a certain amount of data is transmitted, the operation is made to wait. In particular, in the case of a dye-sublimation type printer, the wait time is extremely long.

On the other hand, in a general digital camera, if the camera is not operated for a predetermined time period or if a predetermined time has passed since the operation of the camera was stopped, an auto-power-off function is activated and the power is turned off. Accordingly, it is possible that in the above-mentioned direct-print operation, the auto-power-off function may be activated at a wait time during the data transmission.

The present invention has been made in order to solve the above problems, and its object is to provide a print system capable of carrying out a normal printing operation, with an electronic camera not turned off during a printing operation, and an electronic camera applicable to this print system.

BRIEF SUMMARY OF THE INVENTION

In order to achieve the above object, according to a first aspect of the present invention, there is provided a print system comprising:

an electronic camera with an auto-power-off function, for taking in image formation of a subject image; and a printer for printing the image information taken in the electronic camera, wherein the auto-power-off function is disabled during a process of printing the image information by the printer, and enabled after the process of printing the image information by the printer is finished.

According to a second aspect of the invention, there is provided a print system comprising:

an electronic camera with an auto-power-off function, for taking in image formation of a subject image; and a printer for printing the image information taken in the electronic camera, wherein during a process of printing the image information by the printer a time period needed until effecting power-off in the auto-power-off function is set to be longer than a set time, and after the process of printing the image information by the printer is finished, the time period needed until effecting power-off in the auto-power-off function is set to be the set time.

According to a third aspect of the invention, there is provided a print system comprising:

an electronic camera with an auto-power-off function, for taking in image formation of a subject image; and a printer for printing the image information taken in the electronic camera, wherein the electronic camera comprises:

transmission means for transmitting the image information to the printer;

determination means for determining whether the image information has normally been transmitted to the printer by the transmission means; and means for initializing a time period needed until effecting power-off in the auto-power-off function when the determination means has determined that the image information has normally been transmitted to the printer.

According to a fourth aspect of the invention, the print system of the third aspect of the invention further comprises means for displaying a message indicating a communication error when the determination means has determined that the image information has not normally been transmitted to the printer.

According to a fifth aspect of the invention, in the print system of the third aspect of the invention, the transmission means transmits the image information in units of a packet, and the determination means determines whether image information of one packet sent from the transmission means has normally been transmitted to the printer.

According to a sixth aspect of the invention, there is provided an electronic camera comprising:

imaging means for taking in image information of a subject image; and transmission means for transmitting the image information acquired by the imaging means to a printer, wherein an auto-power-off function is disabled while the image information transmitted from the transmission means is being subjected to a print process in the printer, and the auto-power-off function is enabled after the print process of the image information in the printer.

According to a seventh aspect of the invention, there is provided an electronic camera comprising:

imaging means for taking in image information of a subject image; and transmission means for transmitting the image information acquired by the imaging means to a printer, wherein a time needed until effecting power-off in an auto-power-off function is set to be longer than a set time while the image information transmitted from the transmission means is being subjected to a print process in the printer, and the time needed until effecting power-off in the auto-power-off function is set to be the set time after the print process of the image information in the printer.

According to an eighth aspect of the invention, there is provided an electronic camera comprising:

imaging means for taking in image information of a subject image;

transmission means for transmitting the image information acquired by the imaging means to a printer;

determination means for determining whether the image information has normally been transmitted to the printer by the transmission means; and means for initializing a time period needed until effecting power-off in the auto-power-off function when the determination means has determined that the image information has normally been transmitted to the printer.

According to a ninth aspect of the invention, the electronic camera of the eighth aspect of the invention further comprises means for displaying a message indicating a communication error when the determination means has determined that the image information has not normally been transmitted to the printer.

According to a tenth aspect of the invention, in the electronic camera of the eighth aspect of the invention, the transmission means transmits the image information in units of a packet, and the determination means determines whether image information of one packet sent from the transmission means has normally been transmitted to the printer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
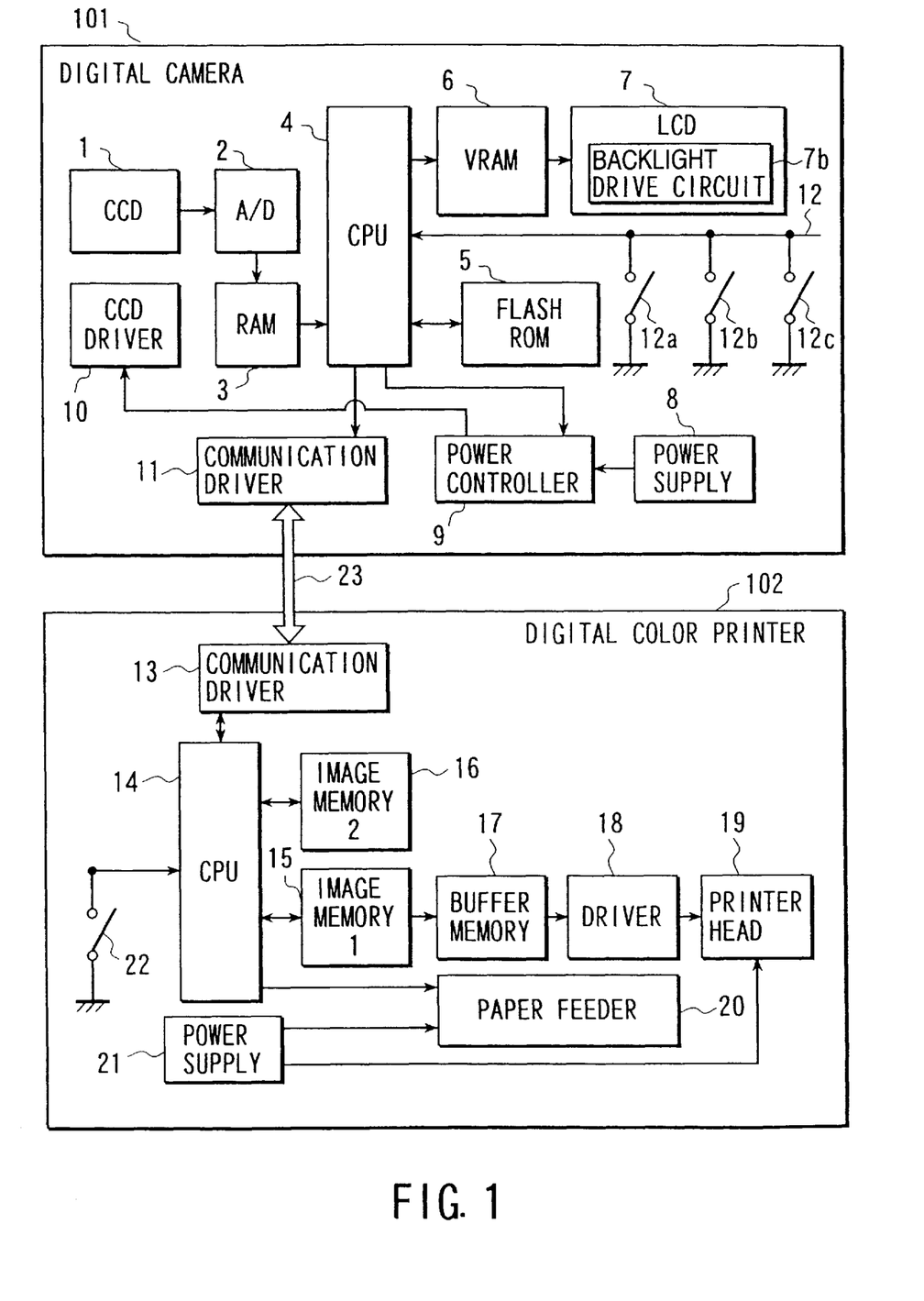
FIG. 1 is a block diagram showing a digital camera and a digital color printer constituting a print system according to a first embodiment of the present invention.
Figure 2:
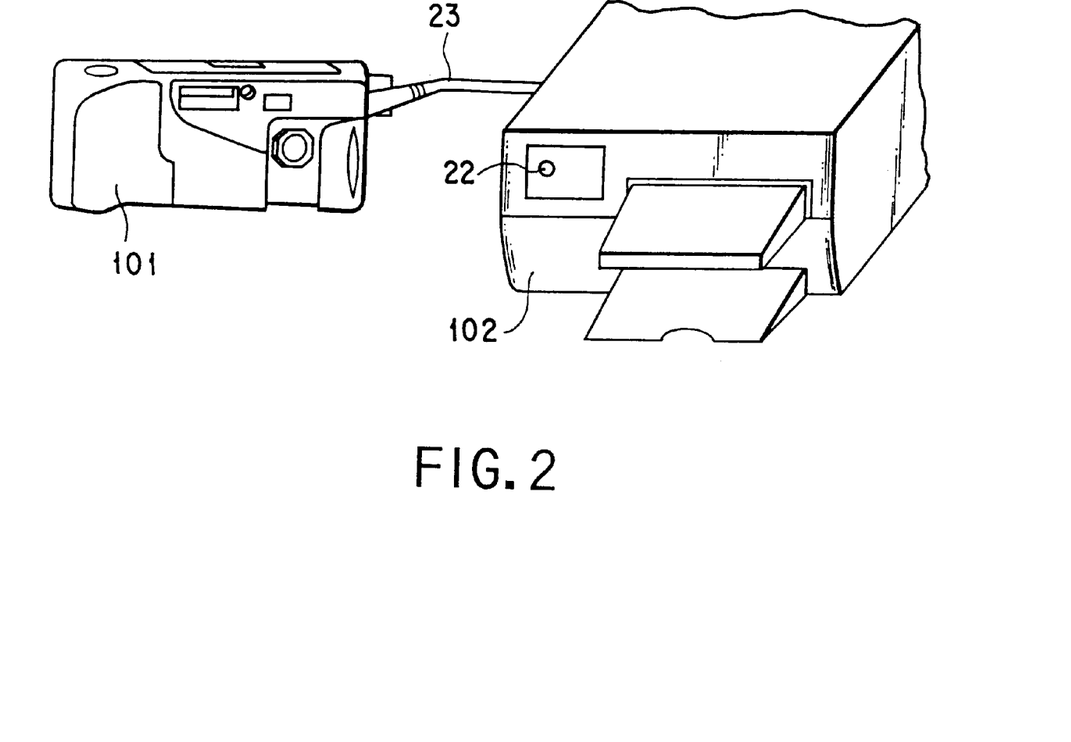
FIG. 2 shows a system structure of the print system shown in FIG. 1.

FIG. 1 is a block diagram of a print system according to a first embodiment of the present invention, and FIG. 2 shows a system structure of the print system. As is shown in FIGS. 1 and 2, the print system comprises a digital camera 101 employed as an electronic camera, a digital color printer 102 employed as a printer, and a communication cable 23 for connecting both. The structures of the respective components will now be described in detail.

The digital camera 101 includes a CCD 1 for receiving light from a subject, which is incident through an imaging lens (not shown) provided at a predetermined position, and producing an image signal through photoelectric conversion. An output of the CCD 1 is connected to an input of a central processing unit (CPU) 4 via a rear-stage analog-to-digital (A/D) converter 2 and a RAM. The CCD 1 is driven by a CCD driver 10 under instructions of the CPU 4.

In addition, a flash ROM 5, various operation switches 12 and a power supply 8 are connected to inputs of the CPU 4. In the digital camera 101 of this embodiment, it is presupposed that the flash ROM 5 serving as a recording medium is built in the camera. Needless to say, however, it is possible to use a detachable medium such as a memory card or a magnetic recording medium.

Figure 3:
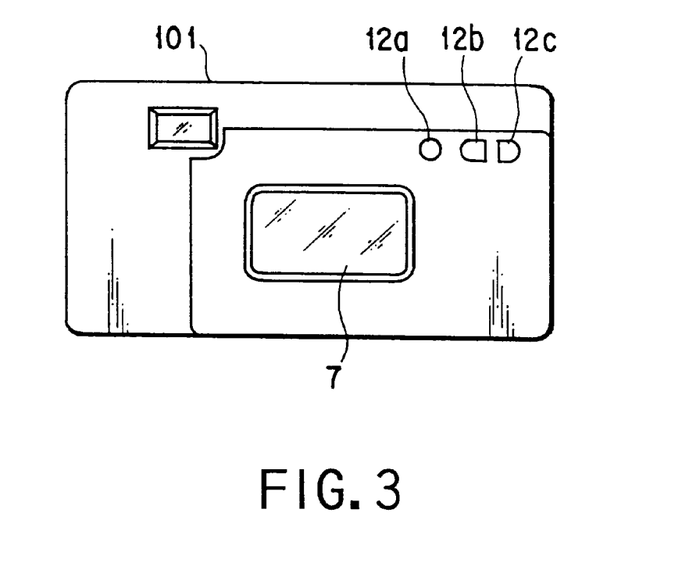
FIG. 3 is a rear-side view of the digital camera of the print system shown in FIG. 1.

The operation switches 12 comprise a reproduction mode switch 12a for instructing display of an LCD 7, and switches 12b and 12c for selecting image frames to be displayed. For example, the switches 12a to 12c, as shown in greater detail in FIG. 3, are provided near the liquid crystal display (LCD) 7 on the rear side of the camera 101. However, the positions of these switches are not limited.

An output is connected to the input of the LCD 7 via the VRAM 6 as well as to inputs of a power controller 9 and a communication driver 11. The LCD 7 includes a backlight drive circuit 7b. The LCD7, as shown in FIG. 3, is disposed at a predetermined position on the rear side of the camera 101. The communication driver 11 is connected to a communication driver 13 of the digital color printer 102 via the communication cable 23, thereby enabling mutual communication.

The power controller 9 supplies a voltage from the power supply 8 to the LCD 7, CCD driver 10 and communication driver 11 at a predetermined timing under control of the CPU 4. The power supply 8 may be, for example, an AA cell or a rechargeable cell. The type of power supply 8, however, is not limited to these.

The digital camera 101 has an auto-power-off function by which the camera is automatically set in the power-off state under control of the CPU 4 if the camera is not operated for a predetermined time period or if a predetermine time period has passed since the operation of the camera was stopped. However, during the above-mentioned direct print operation of the printer 102, the auto-power-off function is disabled and the camera is not set in the power-off state because of the continuation of the non-operation time. After the direct print operation is finished, the auto-power-off function is set again.

In the digital color printer 102, the communication driver 13 is connected to the communication driver 11 of the digital camera 101 over the communication cable 23, and an output of the driver 13 is connected to an input of a CPU 14. An output of the CPU 14 is connected to an input of a paper feeder 20 as well as to a print head 19 via an image memory 15, an image memory 16, a buffer memory 17 and a driver 18. Moreover, the CPU 14 is connected to a print start switch 22 which is operated by the operator to instruct start of print. The print start switch 22 is disposed, for example, at a position shown in FIG. 2. The print start switch 22 may be provided on the digital camera 101.

A power supply 21 converts an external AC to a DC and supplies it to each block of the digital color printer 102 at a predetermined voltage.

Needless to say, communication between the communication drivers 11 and 13 may be established not only by the communication table 23 but also by other conventional communication means such as infrared or radio communication. The printing method of the digital color printer 102 is, for example, a dye-sublimation-type thermal transfer method.

With respect to the above-described structure, the operation of the digital camera 101 will first be described. An image is picked up by the CCD 1 and an analog signal corresponding to the image is input to the A/D converter 2. The analog signal is converted to a digital signal through the A/D converter 2 and the digital signal is temporarily stored in the RAM 3 on the rear stage.

The data stored in the RAM 3 is read out by the CPU 4 and subjected to various processing, e.g. color conversion such as white balancing or JPEG image compression, by means of an arithmetic section in the CPU 4. After the various processing is completed, the image data is successively stored in the flash ROM5 in units of a frame.

If the operator operates the reproduction mode switch 12a in this state, the information on the operation is recognized by the CPU 4 and the image data in the flash ROM 5 is read out under control of the CPU 4. The compressed image data is decompressed for LCD display. The resultant data is written in the image memory VRAM 6 for display and a display image appears on the LCD 7. At the same time, power is supplied to the backlight drive circuit 7b.

Subsequently, the switches 12b and 12c are operated by the operator, and image data stored in the flash ROM is properly chosen and display images are similarly displayed in succession on the LCD 7. There are cases where a complementary color filter or a primary color filter is used in the CCD 1 of the camera 101 to produce a color image. In each case, the camera 101 can be connected to the digital color printer 102.

On the other hand, when the direct print is to be carried out, the CPU 14 of digital color printer 102 receives image file data from the camera 101. The image file data is temporarily stored in the image memory 16. The CPU 14, while decompressing the image file data stored in the image memory 16, develops on the image memory 15 color data of yellow (Y), magenta (M) and cyan (C) in succession for one frame. Thus, the direct print process is carried out. Needless to say, in this case, processes such as a gamma conversion process for each color and an edge enhancement process may be performed.

The CPU 14 enables the paper feeder 20 to feed a printing paper sheet to a print start position, and at the same time the CPU 14 transfers the print image data from the image memory 15 to the buffer memory 17 to the driver 18 and controls the print head 19 to start printing. The print head 19 is able to print one-line data on the paper sheet at a time. The paper feeder 20 feeds the paper sheet by a degree corresponding to the one line each time the printing of the one-line data is completed.

In this manner the CPU 14 drives the paper feeder 20 and transfers the print data to the print head 19 in synchronism. If the print operation of the desired image is completed, the CPU 14 drives the paper feeder 20 to discharge the paper sheet.

At least in part of the time period during which the data is being sent from the digital camera 101 to the digital color printer 102, the operations of the backlight drive circuit 7b of LCD 7 and the signal processing circuit operated at the time of imaging, for example, CCD driver 10, an imaging lens drive system or a strobe charge circuit, are stopped for saving power.

When the digital camera 101 is connected to the digital color printer 102 over the communication cable 23, a connection confirmation signal is sent from the digital color printer 102 to the camera 101. Thus, the connection with the digital color printer 102 is confirmed by the camera 101, and a response signal is sent to the digital color printer 102.

The print operation is started if the user turns on the print start switch 22 on the digital color printer 102 in the state in which the desired image to be printed is displayed as reproduced image on the LCD 7 of the camera 101. Needless to say, the print operation may be started after full-screen display on the LCD 7 is completed.

Figure 4A:
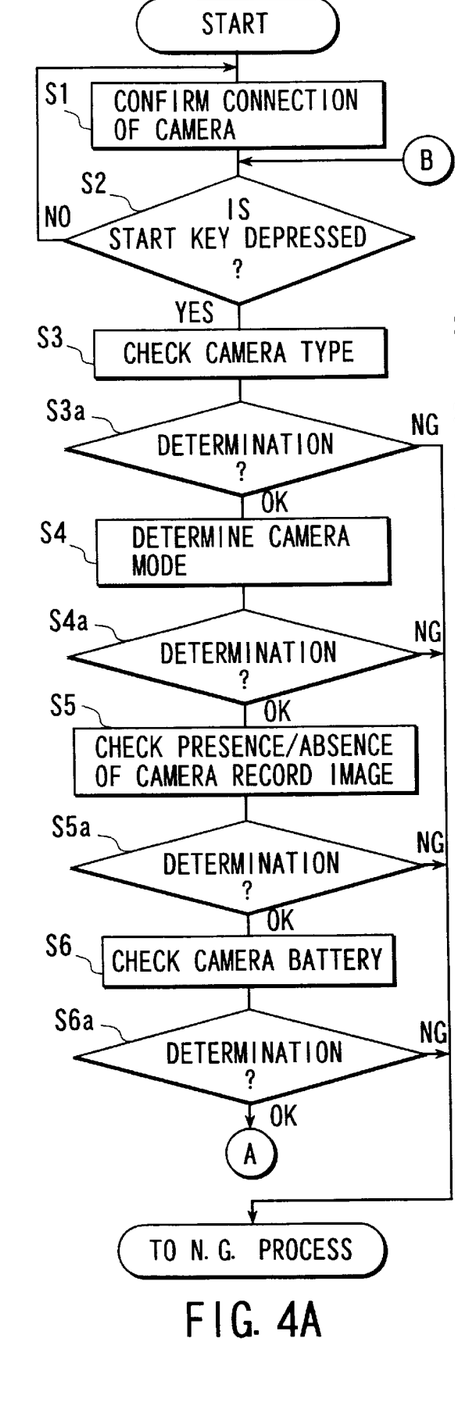
FIG. 4A is a flow chart illustrating a print process in the print system shown in FIG. 1.
Figure 4B:
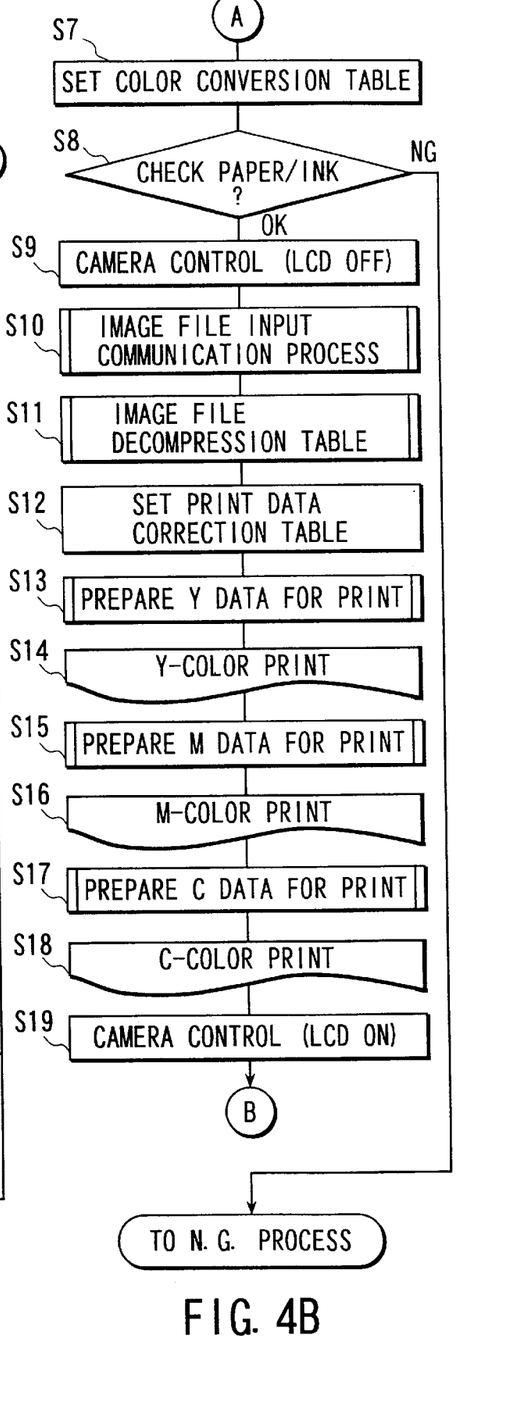
FIG. 4B is a flow chart illustrating a print process in the print system shown in FIG. 1.

With reference to the flow charts of FIGS. 4A and 4B illustrating the print process, the print operation of the CPU 14 following the depression of the print start switch 22 will now be described.

If the operation starts, the CPU 14 confirms whether the digital camera 101 is connected to the digital color printer 102 by means of the communication cable 23 (step S1). Then the CPU 14 detects whether the print start switch 22 of digital color printer 102 has been depressed (step S2). If the switch 22 is not depressed, the control returns to step S1.

While the print start switch 22 provided on the digital color printer 102 is not depressed, the processing in step S1 is repeated. Thus, communication with the digital color camera 101 is performed periodically and automatic power-off due to time-out of the digital camera 101 is prevented.

On the other hand, if it is confirmed in step S2 that the print start key 22 has been depressed, the CPU 14 detects information on the type of the device connected via the communication cable 23 (step S3). On the basis of the information on the device, the type of the device, which permits direct printing from the digital camera 101, is confirmed (step S3a). If the type of the device is not proper, the control goes to an N.G. process. If the type of the device is proper, the information on the device is stored in the memory built in the CPU 14.

The CPU 14 then discriminates the operation mode of digital camera 101. Only when the digital camera 101 is in the reproduction mode, the control goes to the next step. Otherwise, for example, in the imaging mode, no printing operation can be effected and thus the control goes to the N.G. process (steps S4 and S4a).

Subsequently, it is determined whether there is a camera record image. If there is an already recorded image, the control goes to the next step. If there is no recorded image, there is no image to be printed out and thus the control goes to the N.G. process (steps S5 and S5a).

Nest, a residual battery power of the digital camera 101 is checked. If the residual battery power is at a predetermined value or above in the state in which the battery is being used as a power supply, the control advances to the next step. If the residual battery power is below the predetermined level, the control goes to the N.G. process (steps S6 and S6a).

It is then determined from the type information of digital camera 101 obtained in step S3 whether the CCD 1 employed uses a complementary color filter or a primary color filter. After the color conversion table is set in accordance with the type information, color adjustment of incoming image data.

It is also checked whether printing paper is set in the digital color printer 102, whether the ink ribbon is set, etc. If the absence of paper, ink ribbon, etc. is determined, the control goes to the N.G. process. If there is no problem, the image data is fetched from the actual digital camera 101 and the print operation is performed (step S8).

Where the control has gone to the N.G. process from each step, the processing associated with each checked item is carried out. For example, if there is no paper or ink ribbon, a display LED, though not shown, is lit or an alarm sound is issued by a buzzer, thereby informing the user of abnormality.

If there is a problem with the digital camera 101, it is possible to display the alarm and at the same time to turn off the power supply 8 of the digital camera 101. Moreover, when the remaining power of the battery of digital camera 101 is less than the predetermined value, it is possible to provide means for preventing start of the printing operation and turning off the power to the digital camera 101 from the color printer 102 side, thereby to avoid the possibility of turn-off of the digital camera 101 during communication.

A description will now be given of the process after step S8, in which the image data from the digital camera 101 is received.

The display on the LCD 7 of digital camera 101 is turned off (step S9). An operation of receiving an image file to be printed is performed (step S10). The image file sent at this time may include data on an imaging condition of the digital camera 101, e.g. a shutter speed or an exposure time. The incoming image file is an image file compressed by JPEG method.

The JPEG-compressed image file is decompressed reversely to the compressing operation, and the original image is obtained (step S11). The correction table for the associated image data is called and set on the basis of the imaging condition data included in the image file (step S12). The correction table is combined with the color conversion table set in step S7 to convert image data of each print color into print data.

In accordance with the colors of the print ink ribbon, yellow ("Y") data is developed on the image memory 15 to print the first color (step S13). The developed color data is output to the printing head in succession for each line, and printing of Y for one screen is effected (step S14).

Then, in steps S15 and S16, another print color, magenta ("M"), is similarly printed for one screen. In steps S17 and S18, cyan ("C") is similarly printed for one screen. Thus, full-color printing of one screen is completed. Once the printing of the one screen is finished, the display on the LCD 7 of digital camera 101 is turned on, and the next screen is set in the state selectable by the user (step S19). The control returns to step S2 to await the next instruction.

In this way, if the data for one screen is output, the printer 102 issues a print end signal to the digital camera 101 and the print operation is finished. During the printing, the use of the operation buttons on the digital camera 101 is prohibited so that the selected reproduced image may not be changed. After the printing operation is finished, the use of the operation buttons is permitted.

In the print system of this embodiment, if the direct print operation of the digital color printer 102 is started, the auto-power-off function in the camera 101 is disabled. The process of switching the auto-power-off function will now be described with reference to the flow chart of FIG. 5.

Figure 5:
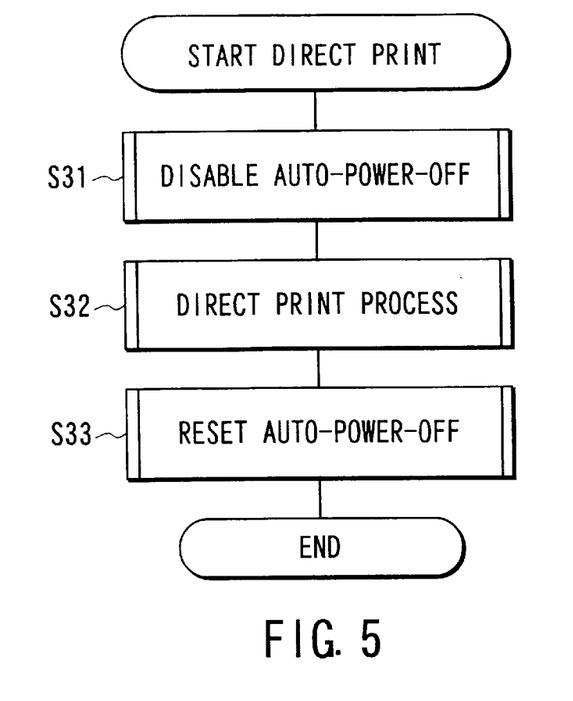
FIG. 5 is a flow chart illustrating a process of switching an auto-power-off function in the print process of the print system shown in FIG. 1.

If it is confirmed that the print start switch 22 has been depressed in step S2 in the print process illustrated in FIG. 4A, the auto-power-off function switching process as illustrated in FIG. 5 is performed. Specifically, when the direct print operation start signal has been transmitted to the digital camera 101 via the communication drivers 13 and 11, the auto-power-off function is disabled in step S31. Subsequently, the direct print process is executed in step S32. In other words, the process from step S3 in FIG. 4A is carried out. If the direct print process or the N.G. process for suspending the printing is finished, the auto-power-off function of the electronic camera 101 is set once again in step S33 and a predetermined time for automatically turning off power is set once again.

As has been described above, according to the print system of the first embodiment, it is possible, by a simpler process, to prevent the auto-power-off function of digital camera 101 from being activated during the direct print operation so that the power is turned off. Moreover, if the direct print operation is finished, the auto-power-off function can be set once again.

A print system according to a second embodiment of the present invention will now be described.

In the print system of the first embodiment, in a case where an error has occurred during the direct print operation and the print operation has been suspended, a power-on state of the digital camera 101 may continue endlessly. By contrast, in the print system of the present embodiment, even in the case where an error has occurred and the print operation has halted, the digital camera 101 is turned off after a predetermined time period.

Figure 6:
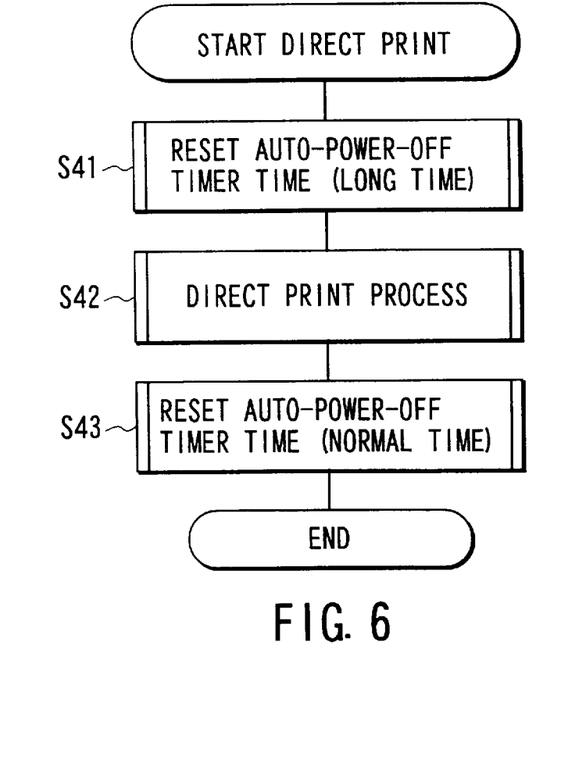
FIG. 6 is a flow chart illustrating a process of switching an auto-power-off function in a print process of a print system according to a second embodiment of the invention.

FIG. 6 is a flow chart illustrating the process of switching the auto-power-off function in the print system according to the second embodiment. The structure of this system is substantially the same as that shown in FIG. 1.

When it has been confirmed in step S2 of the print process illustrated in FIG. 4A that the print start switch 22 is depressed, the auto-power-off function switching process shown in FIG. 6 is performed. Specifically, if the direct print operation start signal is transmitted to the digital camera 101 via the communication drivers 13 and 11, a set time for auto-power-off is reset to a predetermined long time period in step S41. This predetermined long time period is set to be sufficiently longer than an ordinary print operation time (including a time needed for error recovery). In the next step S42, the direct print process is executed. In other words, the process from step S3 in FIG. 4A is executed. If the direct print process or the N.G. process for suspending the print operation is finished, the time for auto-power-off of the electronic camera 101 is restored to a normal time in step S43.

As has been described above, according to the print system of the second embodiment, even if an error has occurred in the direct print operation and error recovery is to be effected, it is prevented by a simpler process that the power to the digital camera 101 is turned off during the error recovery process. Moreover, even if an error has occurred and the print operation has stopped, the power to the digital camera 101 is turned off after a predetermined set time. If the direct print operation is finished, the auto-power-off function is enabled once again.

A print system according to a third embodiment of the invention will now be described.

In the print system of the second embodiment, in a case where an error has occurred in the direct print operation and an error recovery has taken more time than expected, there is a possibility that the power to the digital camera 101 may be turned off during the error recovery. By contrast, in the present embodiment, even if the error recovery has taken more time than expected, the set time for auto-power-off of the digital camera 101 is extended unless a communication error has occurred. Accordingly, even if the error recovery has taken more time than expected for some reason, the auto-power-off function is not effected. If a communication error has occurred, the set time for auto-power-off is not extended and the power is turned off.

Figure 7:
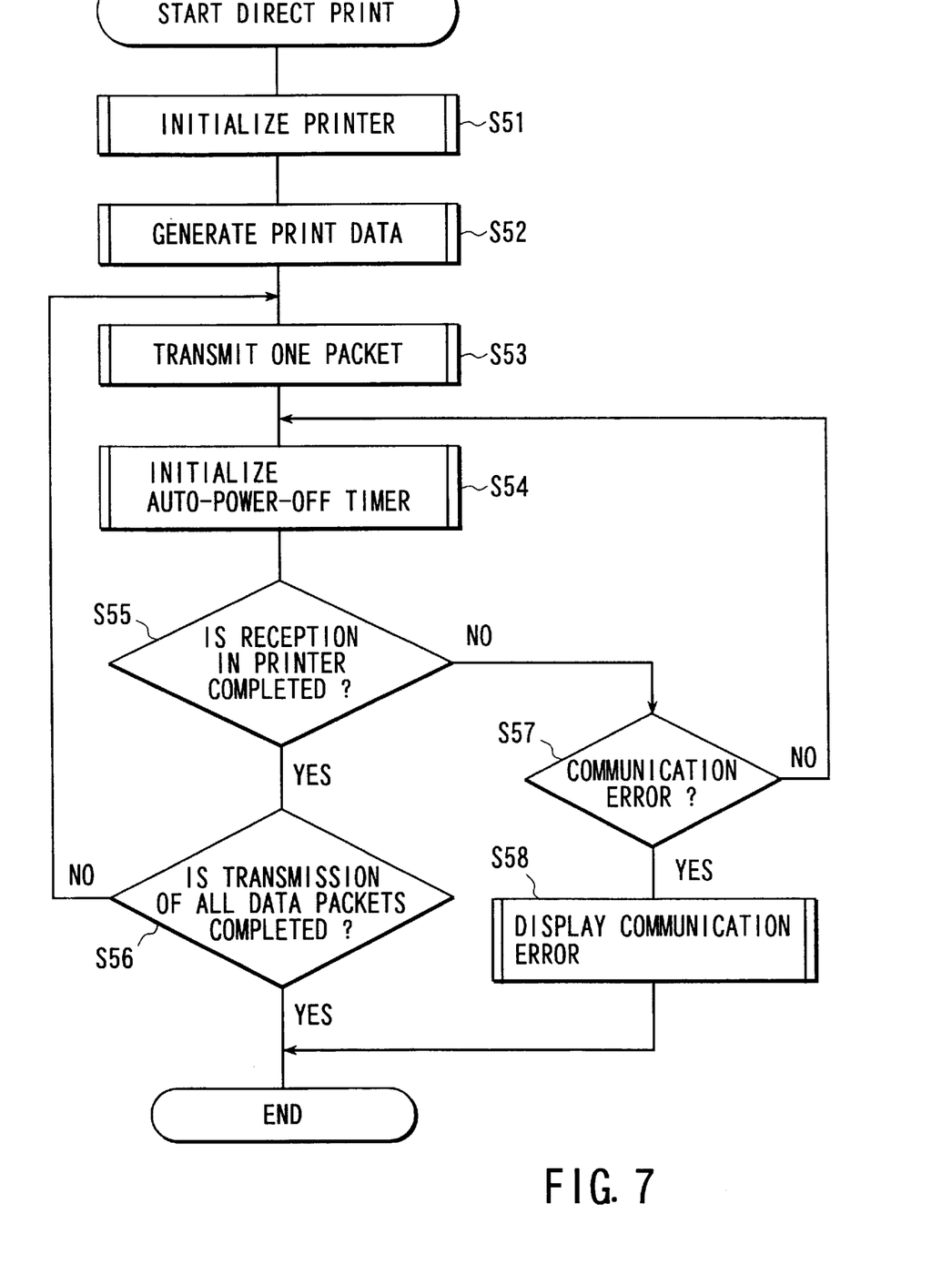
FIG. 7 is a flow chart illustrating a print process of a print system according to a third embodiment of the invention.

FIG. 7 is a flow chart illustrating a print process in the print system according to the third embodiment. The structure of this system is substantially the same as that shown in FIG. 1.

If it has been confirmed that the print start switch 22 is depressed, the print process shown in FIG. 7 is executed. Specifically, when the direct print operation start signal has been transmitted to the digital camera 101 via the communication drivers 13 and 11, the printer is initialized in step S51. In step S52, print data is generated by the digital camera 101. Then in step S53, one packet of the print data is transmitted to the printer 102.

Subsequently, in step S54 the timer for auto-power-off is initialized. In step S55, it is checked whether the one-packet data has been fetched in the printer 102. If the fetching of data is not completed, the presence/absence of a communication error is checked in step S57. The communication error is, for example, a defect in transmission signals from the printer, or a time-out. If a communication error has occurred, the occurrence of the error is displayed in step S58. Since the timer for auto-power-off is not initialized thereafter, the power will be turned off in due course of time by the auto-power function. If no communication error has occurred, the control returns to step S54.

If the completion of fetching of the one-packet data is confirmed in step S55, it is checked whether the transmission of all packet data is completed in step S56. If the transmission is not completed, the control returns to step S53 and the next packet is transmitted. If the transmission is completed, the present routine is finished.

As has been described above, according to the print system of the third embodiment, data from the camera 101 is transmitted in units of a packet in the direct print operation by a simpler process. Each time one-packet transmission is started, the timer for auto-power-off is initialized. If an error has occurred, the power is turned off after an already set auto-power-off time has passed, without resetting the auto-power-off time. Accordingly, the direct print is exactly performed and, if abnormality of the print operation is detected, the power can surely be turned off.

According to the print system of the present invention as described above, the auto-power-off function of the electronic camera is disabled in the print operation on the basis of output from the print start instruction means. Thus the power is not turned off during the print operation.

Moreover, according to the present invention, on the basis of the output from the print start instruction means, the time period needed until effecting power-off in the auto-power-off function of the electronic camera is set to be longer than a normal set time. Accordingly, the time period needed until effecting power-off in the print operation can be set to a proper value.

Furthermore, according to the present invention, while the print operation is being normally performed, the initialization of the time needed until effecting power-off of the electronic camera is continued. If abnormality has occurred in the print operation, the time needed until effecting power-off is not initialized, and the exact printing is performed. In addition, the power-off can be effected properly at the time of abnormality of printing.

Besides, according to the electronic camera of this invention, the time needed for effecting power-off is switched depending on the print state of the printer. Thus, the print operation can be exactly performed, and the power can be properly turned off at the time of abnormality of the print process.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A print system comprising:
   an electronic camera with an auto-power-off function, for taking in image information of a subject image; and
   a printer for printing the image information taken in the electronic camera,
   wherein the auto-power-off function is disabled during a process of printing the image information by the printer, and enabled after the process of printing the image information by the printer is finished.

2. A print system comprising:
   an electronic camera with an auto-power-off function, for taking in image formation of a subject image; and
   a printer for printing the image information taken in the electronic camera,
   wherein said electronic camera comprises:
      transmission means for transmitting the image information to the printer;
      determination means for determining whether the image information is normally transmitted to the printer by the transmission means; and
      means for initializing a time period needed until effecting power-off in the auto-power-off function when said determination means has determined that the image information is normally transmitted to the printer.

3. The print system according to claim 2, further comprising means for displaying a message indicating a communication error when said determination means determined that the image information is not normally transmitted to the printer.

4. The print system according to claim 2, wherein said transmission means transmits the image information in units of a packet, and said determination means determines whether image information of one packet sent from the transmission means is normally transmitted to the printer.

5. An electronic camera comprising:
   imaging means for taking in image information of a subject image; and
   transmission means for transmitting the image information acquired by said imaging means to a printer,
   wherein an auto-power-off function is disabled while the image information transmitted from the transmission means is being subjected to a print process in the printer, and the auto-power-off function is enabled after the print process of the image information in the printer.

6. An electronic camera comprising:

imaging means for taking in image information of a subject image;

transmission means for transmitting the image information acquired by said imaging means to a printer;

determination means for determining whether the image information is normally transmitted to the printer by the transmission means; and means for initializing a time period needed until effecting power-off in the auto-power-off function when said determination means determined that the image information is normally transmitted to the printer.

7. The electronic camera according to claim 6, further comprising means for displaying a message indicating a communication error when said determination means determined that the image information is not normally transmitted to the printer.

8. The electronic camera according to claim 6, wherein said transmission means transmits the image information in units of a packet, and said determination means determines whether image information of one packet sent from the transmission means is normally transmitted to the printer.

* * * * *